G. R. RICH.
VALVE ACTUATING DEVICE FOR INTERNAL COMBUSTION ENGINES.
APPLICATION FILED MAY 11, 1914.
1,123,142.  Patented Dec. 29, 1914.
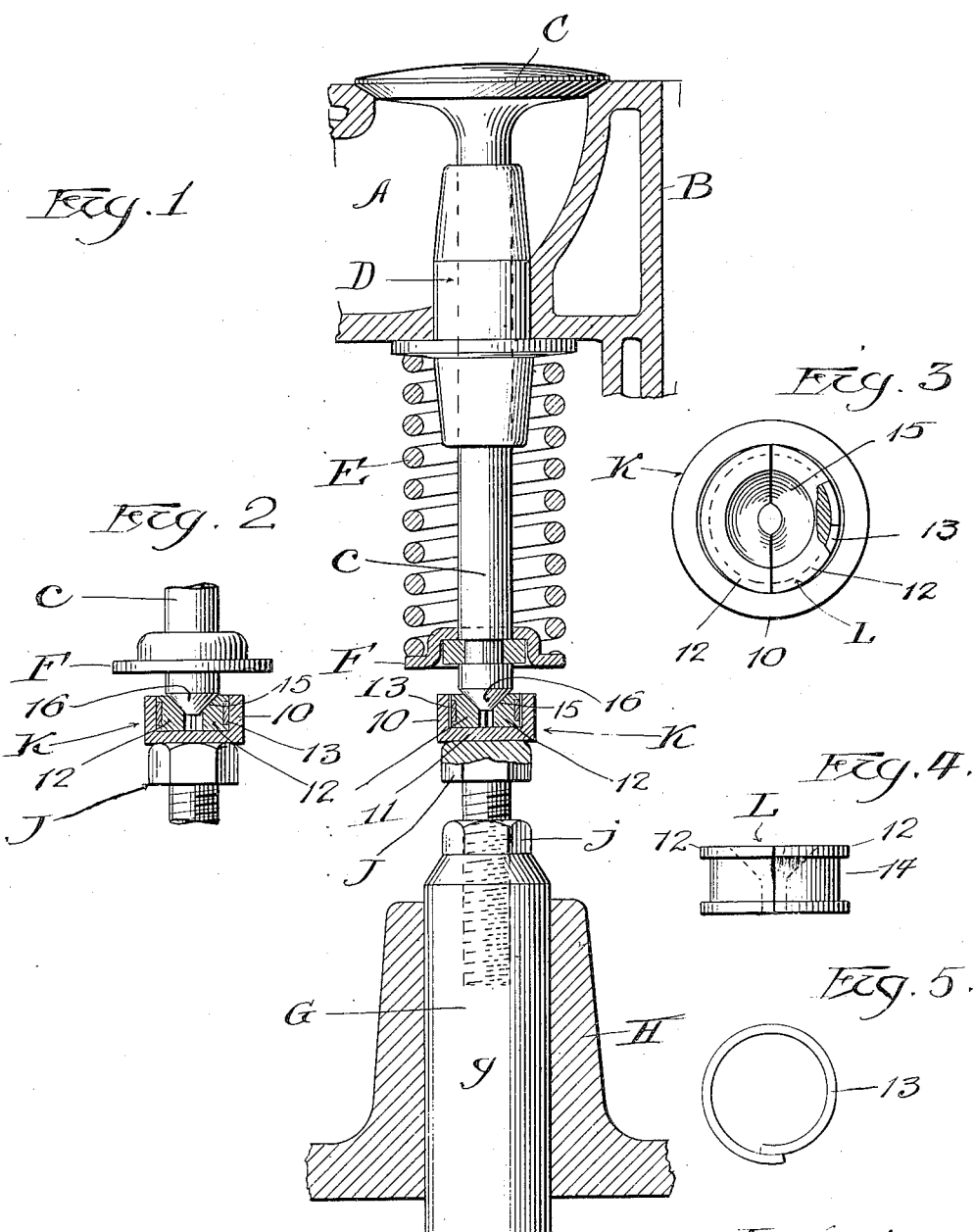

UNITED STATES PATENT OFFICE.

GEORGE R. RICH, OF OAK PARK, ILLINOIS, ASSIGNOR TO RICH TOOL COMPANY, OF CHICAGO, ILLINOIS, A CORPORATION OF ILLINOIS.

VALVE-ACTUATING DEVICE FOR INTERNAL-COMBUSTION ENGINES.

1,123,142.   Specification of Letters Patent.   Patented Dec. 29, 1914.

Application filed May 11, 1914. Serial No. 837,614.

*To all whom it may concern:*

Be it known that I, GEORGE R. RICH, a citizen of the United States, and a resident of Oak Park, county of Cook, and State of Illinois, have invented certain new and useful Improvements in Valve-Actuating Devices for Internal-Combustion Engines, of which the following is declared to be a full, clear, and exact description.

This invention relates to puppet valves for internal combustion engines and its principal object is to provide improved means for minimizing the noise and shock and the wear and tear upon the contacting ends of the valve stems and push rods.

According to the common practice, the valve stem and its push rod are so proportioned and adjusted as to leave a slight space between their adjacent ends, whenever the valve is seated, and whereby the push rod and cam may be relieved at such intervals from the pressure of the spring which seats the valve. To absorb the frequent shocks caused by the push rod striking against the end of the valve stem, I provide an improved form of cushioning device or shock absorber between their adjacent ends, which is of novel, simple, substantial and durable construction and which may be applied to almost any puppet valve actuating mechanism having a contacting valve stem and push rod.

This invention consists, therefore, in the certain novel features, hereinafter fully set forth and claimed.

The invention is clearly illustrated in the accompanying drawing, in which:—

Figure 1 is a view partly in side elevation and partly in vertical section of a puppet valve mechanism, embodying a simple form of the present invention and showing the valve seated; Fig. 2 is a similar view of fragments of the adjacent ends of the valve stem and push rod, the latter having been raised by the cam; Fig. 3 is a plan of the shock absorbing device removed from the push rod; Fig. 4 is a side elevation of a split block forming part of the shock absorbing device, and Fig. 5 is a plan of a spring also forming a part thereof.

In the said drawings, the reference letter A, designates one of the ports leading to the cylinder B, of an internal combustion engine; said port is controlled by a puppet valve C, having a valve stem c, sliding in to guide D, and encircled by a coiled, compression spring E, which bears against a shouldered member F, on the valve stem and acts to move said stem downward and seat the valve. Below the stem is the push rod G, which is slidably mounted in a guide H, and receives its lifting movement from a cam *i*, on the cam shaft I. Preferably the push rod is made longitudinally adjustable as for instance by a tap bolt J, threaded in the upper end of the member *g* of the push rod, and having a set nut *j*, threaded thereon and bearing against the end of the member *g*. Ordinarily the parts are so arranged that the tap bolt strikes the valve stem, when moved upward, and unseats the valve.

With the present embodiment of the invention, the tap bolt is spaced away from the lower end of the valve stem *c*, to receive therebetween the cushioning or shock absorbing device K, constituting the present invention. In its present form, I employ a cylindrical cuplike member 10, which rests upon the head of the tap bolt and is free to move transversely thereof. Resting on the bottom 11, of said member 10, are two similar halves 12 of an expansion member, L, here shown in the form of a split block of which the two members are yieldingly pressed together by a split spring band 13, held in a peripheral groove 14, in the split block. The split block has the same radius as the interior cylindrical wall of the member 10, but the combined width of the two halves is less than the diameter of said wall.

In the upper face of the expansion member L, is formed a tapered socket 15, for the reception of a tapered element 16, here shown as comprising the end portion of the valve stem; conveniently the valve stem and socket are tapered to an angle of 45 degrees. The tapered end of the valve stem constantly bears against the tapered face of the split block, but inasmuch as the two parts thereof are free to spread apart against the action of the spring band, there is no appreciable downward pressure exerted against the push rod and cam. Whenever the cam raises the push rod, the initial action on the shock absorbing device is to spread apart the two halves 12, of the split block, because in the initial upward movement of the latter, the inclined or tapered faces of the socket portion ride up the tapered face of the end portion of the valve stem and spread apart, thereby partially unwrapping the spring band until its entire length engages the interior cylindrical wall of the member 10, whereupon the continued upward movement of the push rod and shock absorbing device acts to lift the valve stem and unseat the valve. After the high place on the cam passes the push rod, the spring E forces the valve, stem, shock absorber and push rod down until the valve seats, after which the spring band 13, contracts, forcing the two halves of the split block toward each other and maintaining them in constant contact with the end of the valve stem while the push rod moves down and up a fraction of an inch during which interval the push rod is relieved from the pressure of the spring E.

Conveniently, the split block may be made from a solid piece, fitting the hollow of the cylindrical cuplike member, and after the groove and tapered socket have been formed, it may be sawed in two along its diameter, the saw kerf being made wide enough to reduce the combined width of the two halves, so as to leave the necessary play or lost motion for accomplishing the desired result.

More or less variation of the exact details of construction is possible without departing from the spirit of this invention. I desire, therefore, not to limit myself to the exact form of the invention shown and described, but intend, in the following claims to point out all of the invention disclosed herein.

I claim as new and desire to secure by Letters Patent:

1. The combination with a puppet valve stem and a reciprocatory push rod, one of said members having a chambered element, a split block therein, having a tapered socket in one face, the parts of said split block being yieldingly pressed together and the other of said members having a tapered element constantly contacting with the tapered face of said socket.

2. The combination with a puppet valve, its stem, a spring for seating said valve, and a reciprocatory push rod, of a cylindrically chambered member interposed between said valve stem and push rod, a split block therein having a tapered socket in one face, the two parts of said split block being spring pressed toward each other, and a tapered end portion for the valve stem constantly contacting with the tapered faces of said split block.

3. The combination with a puppet valve, its stem, a spring for seating said valve and a reciprocatory push rod for unseating said valve, of a chambered member interposed between the ends of said valve stem and push rod, a split block in the chamber of said member and having a tapered socket in one face, a spring band encircling said split block and pressing the parts thereof together, and a tapered end portion for the valve stem contacting with the tapered face of said split block.

4. The combination with a puppet valve, its stem, a spring for seating said valve, and a reciprocatory push rod, of a cuplike member having a cylindrical chamber and interposed between the ends of said valve stem and push rod, a split block in said chamber, the members of said split block having tapered opposing faces, a spring for forcing said members of the split block toward each other, and a tapered member in constant contact with the tapered faces of said split block.

5. The combination with a puppet valve, its stem, a spring for seating said valve and a reciprocatory push rod, of a cuplike member interposed between the ends of said valve stem and push rod, a split block in said member and capable of bearing against the inner cylindrical wall thereof, said split block having a tapered socket in one face and a peripheral groove in its side, a spring band seated in said groove and acting to press the parts of said split block toward each other, and a tapered end on said valve stem constantly contacting with the tapered face of the socket.

6. The combination of a puppet valve and its stem, a push rod having two members, the one longitudinally adjustable with respect to the other, a cuplike member interposed between the ends of said valve stem and push rod, a laterally expansible and contractible member in said cuplike member, capable of engaging the interior side wall of said cuplike member and in constant contact with the end of said valve stem.

7. The combination of a puppet valve, its stem, a reciprocatory push rod, a cuplike member interposed between said valve stem and push rod, and a laterally expansible and contractible member in said cuplike member and capable of engaging the side walls thereof, said expansible and contractible member being in constant contact with the end of said valve stem.

GEORGE R. RICH.

Witnesses:
FRANK MARTY,
S. H. WHITESIDE.